United States Patent [19]

Schaedler et al.

[11] Patent Number: 5,960,616
[45] Date of Patent: Oct. 5, 1999

[54] DUCTED FAN MOWER DECK

[75] Inventors: Axel Schaedler, North Royalton; Michael Miller, Brunswick, both of Ohio

[73] Assignee: MTD Products Inc, Cleveland, Ohio

[21] Appl. No.: 08/954,296

[22] Filed: Oct. 17, 1997

Related U.S. Application Data

[62] Division of application No. 08/424,894, Apr. 19, 1995, Pat. No. 5,873,225.

[51] Int. Cl.6 .................................................. A01D 34/82
[52] U.S. Cl. .............................. 56/17.5; 56/320.1; 56/295
[58] Field of Search .................................. 56/320.1, 320.2, 56/17.4, 17.5, 13.4, 16.7, 12.8, 255, 295

[56] References Cited

U.S. PATENT DOCUMENTS 2,983,096  5/1961  Phelps .
4,326,370  4/1982  Thorud .................................. 56/17.5 X
5,390,480  2/1995  Simonson et al. ...................... 56/320.2
5,454,216  10/1995 Myszka .................................... 56/17.5
5,457,947  10/1995 Samejima et al. ................. 56/320.1 X

*Primary Examiner*—Heather Shackelford
*Attorney, Agent, or Firm*—Emerson & Associates; Roger D. Emerson; Timothy D. Bennett

[57] ABSTRACT

A mower deck is disclosed that utilizes an auxiliary source of pressurized air in order to avoid clipping buildup under the mowing deck, most particularly at the trailing edge of the discharge chute. The auxiliary source of air comes through a cloverleaf shaped hole in the mower deck. The spindle is mounted to the mower deck through this hole, as in conventional mowers. However, unlike conventional mowers, because the hole in the mower deck has a cloverleaf configuration air can flow through the corner portions of the cloverleaf configured hole and act as an auxiliary source of air even though the spindle is mounted to the mower deck through the hole.

1 Claim, 4 Drawing Sheets

DUCTED FAN MOWER DECK

This is a division of application Ser. No. 08/424,894, filed Apr. 19, 1995 now U.S. Pat. No. 5,873,225.

FIELD OF INVENTION

This invention relates to an improved mower deck.

BACKGROUND OF THE INVENTION

Rotary mower decks typically have a single or multiple blade which cuts vegetation by the rotation of such blades in a controlled area such as underneath a mower deck. Typically, this mower deck includes a single discharge chute which faces either to the side or, occasionally, to the rear of the associated frame which supports same for travel over the ground. These mower decks need a large volume of air in order to provide for the movement of grass clippings underneath the deck and through the discharge chute. Typically, this volume of air is provided by having the lower lip of the lower deck spaced from the ground such that the needed air can travel between the mower deck and the ground before being passed through the discharge chute. However, this distance provides for a space wherein the noise of the blades can pass to the outside world and, in addition, limits the shortest length of cut for the blades.

OBJECTS OF SUMMARY OF THE INVENTION

It is an object of this present invention to increase the efficiency of mower decks.

It is another object of the present invention to allow for increased depth of the sidewall of a mower deck.

It is yet another object to the present invention to increase the efficiency of the dispersal of grass clippings in a mower deck.

It is still another object of present invention to reduce the plugging and/or to grass build-up within the confines of the mower deck.

It is a further object of the present invention to increase the bagging efficiency of mower decks.

Other objects and more complete understanding of the invention may be had by referring to the drawings in which:

BRIEF DESCRIPTION OF THE DRAWINGS

Structure, operation, and advantages are presently disclosed preferred embodiment of the invention will become apparent when consideration of the following description taken in conjunction with the accompanying drawings wherein.

DETAILED DESCRIPTION OF THE INVENTION

Figure 1:
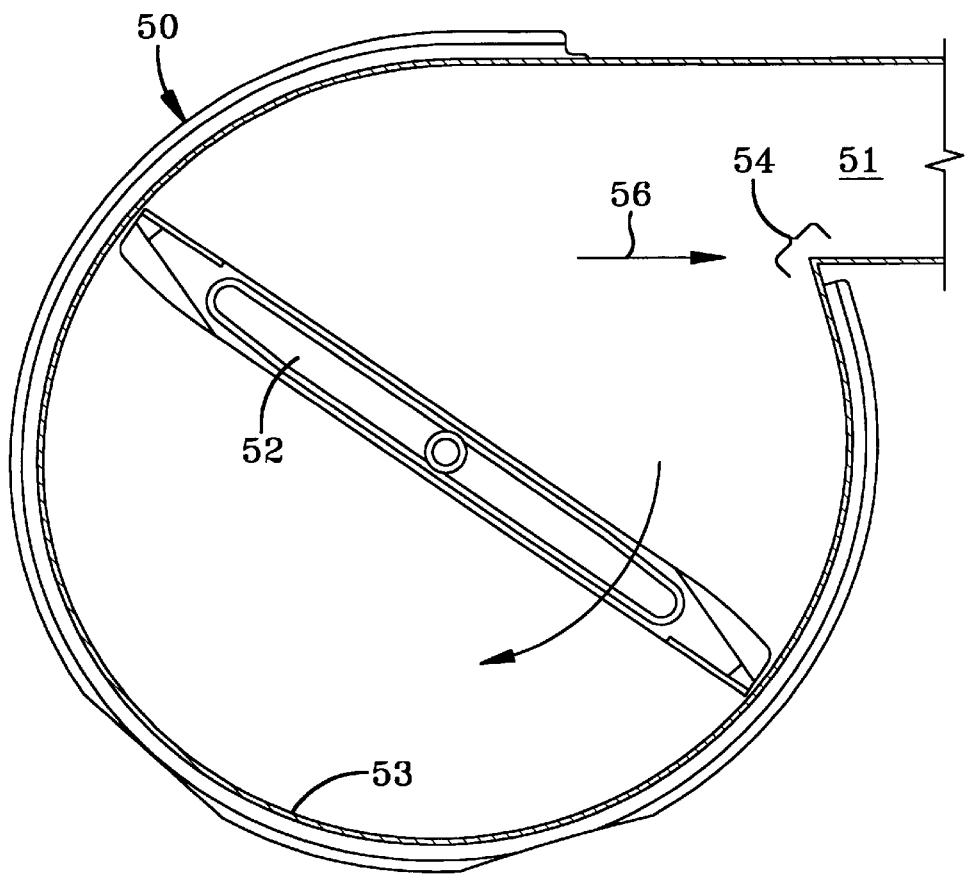
FIG. 1 is a diagram of the airflow created by the invention in a mower deck.

The invention of this application is directed to the use of high-pressure air in order to improve the cutting efficiency of rotary lawn mowers. The invention has particular application to lawn mowers having cutting decks extremely close to the ground and/or decks otherwise having a reduced volume of air passing through the deck and/or out the discharge chute. The invention will be described in an embodiment incorporating a single 30 inch blade in a rear discharge type riding lawn mower.

The invention of this application relates to incorporation of a pressure differential creating device to be associated with a mower deck 50 having a discharge chute 51 and a rotary blade 52.

In the typical mower deck, when the blade is rotated at slow speeds, operated under heavy loading conditions and/or the deck is deprived of a rapid-flow of replacement air, there is a tendency to clog or build up grass clumps throughout the confines of the mower deck; most particularly at the trailing edge 54 of the discharge chute. It is at this location that any build up is particularly troublesome because, as grass clippings build up at this location, they also reduce the cross-sectional area of the discharge chute and disrupt the laminar flow of the circulating air around the confines of the mower deck.

The present invention alleviates this problem by incorporating an additional pressure differential creating device with the mower deck, such pressure differential device increasing the pressure and velocity of air underneath the mower deck, most particularly at the trailing edge 54 of the discharge chute. This pressure differential device acts to increase the velocity of air underneath the mower deck as well as encouraging the vegetation residue to travel through the discharge chute 51 and not build up at the trailing edge 54 or elsewhere.

In the preferred embodiment, the mower deck 50 is a 30 inch singe-bladed rear discharge mower deck for use with a riding lawn mower. Although this particular deck is a single-bladed rear discharge design, it could be understood that the invention could be utilized with side-to-side multiple spindle mower decks as well as other rotary mower devices that could utilize an increase in pressure differential, most particularly at the trailing edge of a discharge chute. These mower decks may be suspended from the underneath of a riding mower, may be interconnected to the front, or may be interconnected to the back of the associated power vehicle as known in the art.

The particular mower deck 50 disclosed also includes sidewalls 53 which extend downward into the vegetation further than in ordinary mower decks. The purpose for this particular additional extension is to reduce the blade noise which escapes from underneath the mower deck 50. While advantageous, this extension of the sidewall 53 downward also has the effect of further reducing the amount of air which can be utilized by the blade otherwise used to create a high enough velocity air flow to provide for satisfactory mowing under all conditions. Particularly troublesome are wet lawns having a high blue grass or other high density concentration of grass blades.

In even a conventional deck, under these circumstances, the air flow caused by the rotary blade 52 underneath the mower deck would be disrupted, causing vegetation build-up on the trailing edge 54 of the discharge chute 51 and otherwise clogging up the laminar air flow which would preferably be present for smooth discharge. With the increased sidewalls of the present preferred embodiment the problem would otherwise be exacerbated.

The present differential pressure device remedies these problems by providing an extra source of high velocity air underneath the discharge chute and, most particularly, at the trailing edge 54 of the discharge chute 51. This pressure differential device increases the apparent velocity of air at the discharge chute, thus to increase the discharge efficiency at this critical point while also protecting the trailing edge 54 of the discharge chute against undesired residue buildup. The trailing edge 54 is the edge located where the discharge chute 51 and the sidewall 53 meet.

Figure 2:
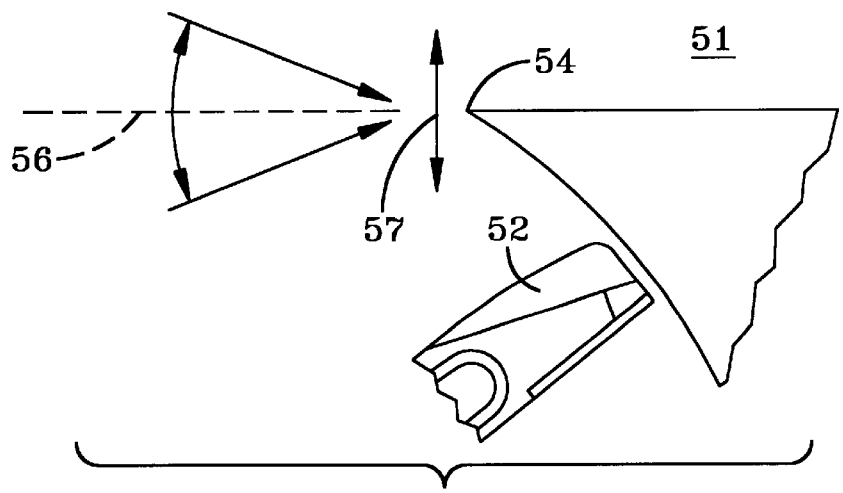
FIG. 2 is an enlarged drawing of the area of the trailing edge of the mower deck diagram of FIG. 1.
Figure 3:
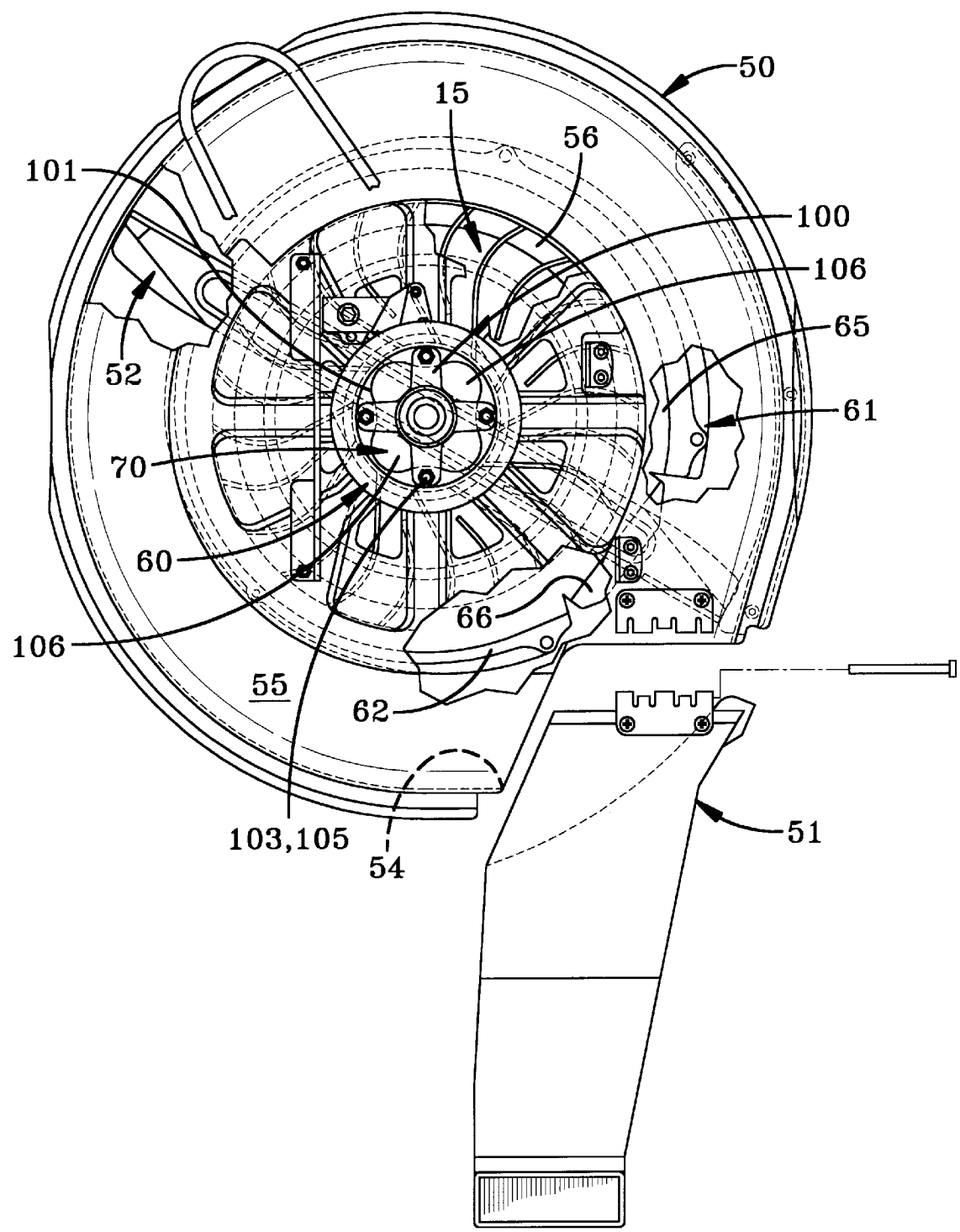
FIG. 3 is a downward-looking view of a mower deck incorporating the invention of the application.
Figure 4:
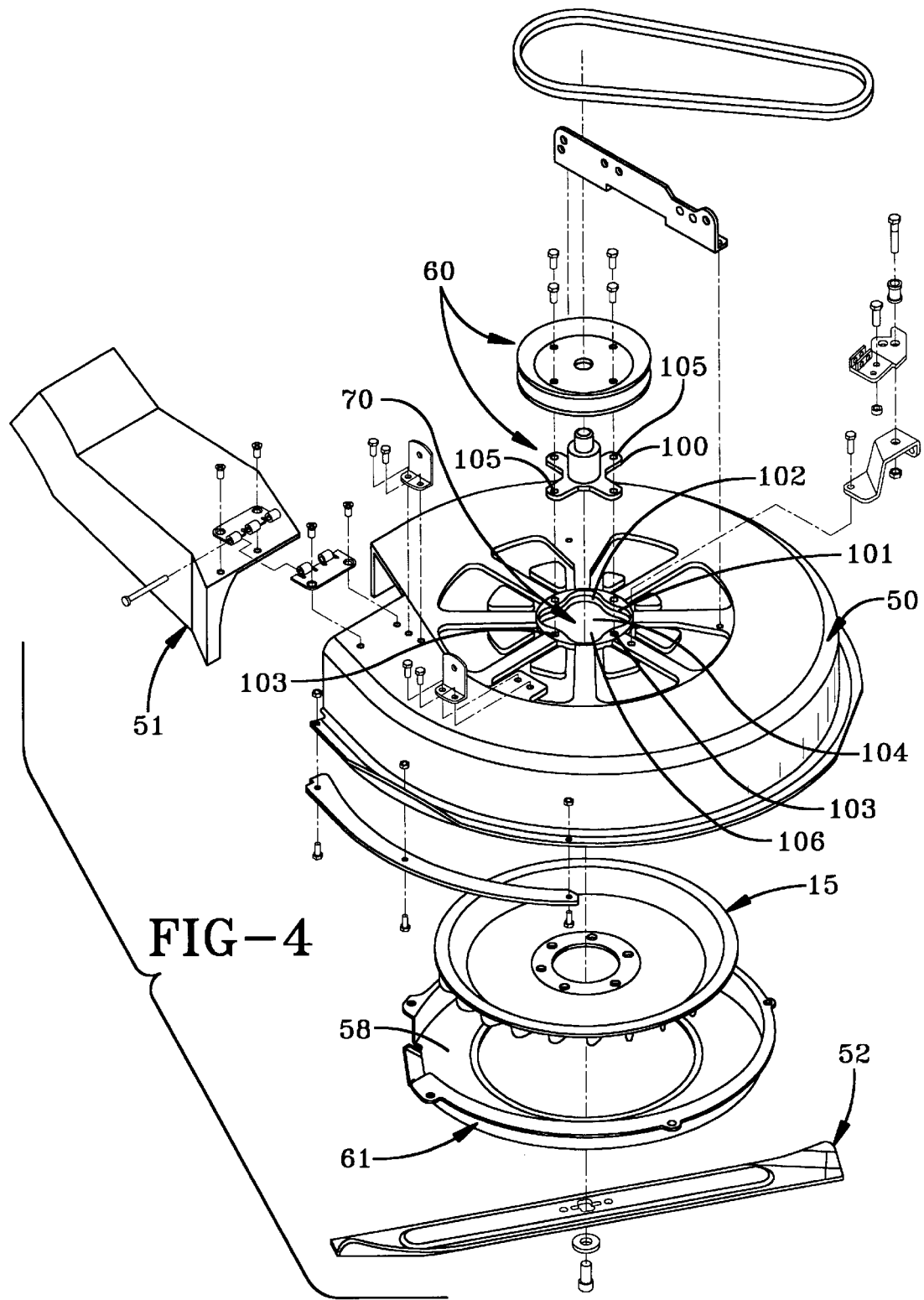
FIG. 4 is a perspective view of the mower deck of FIG. 3.
Figure 5:
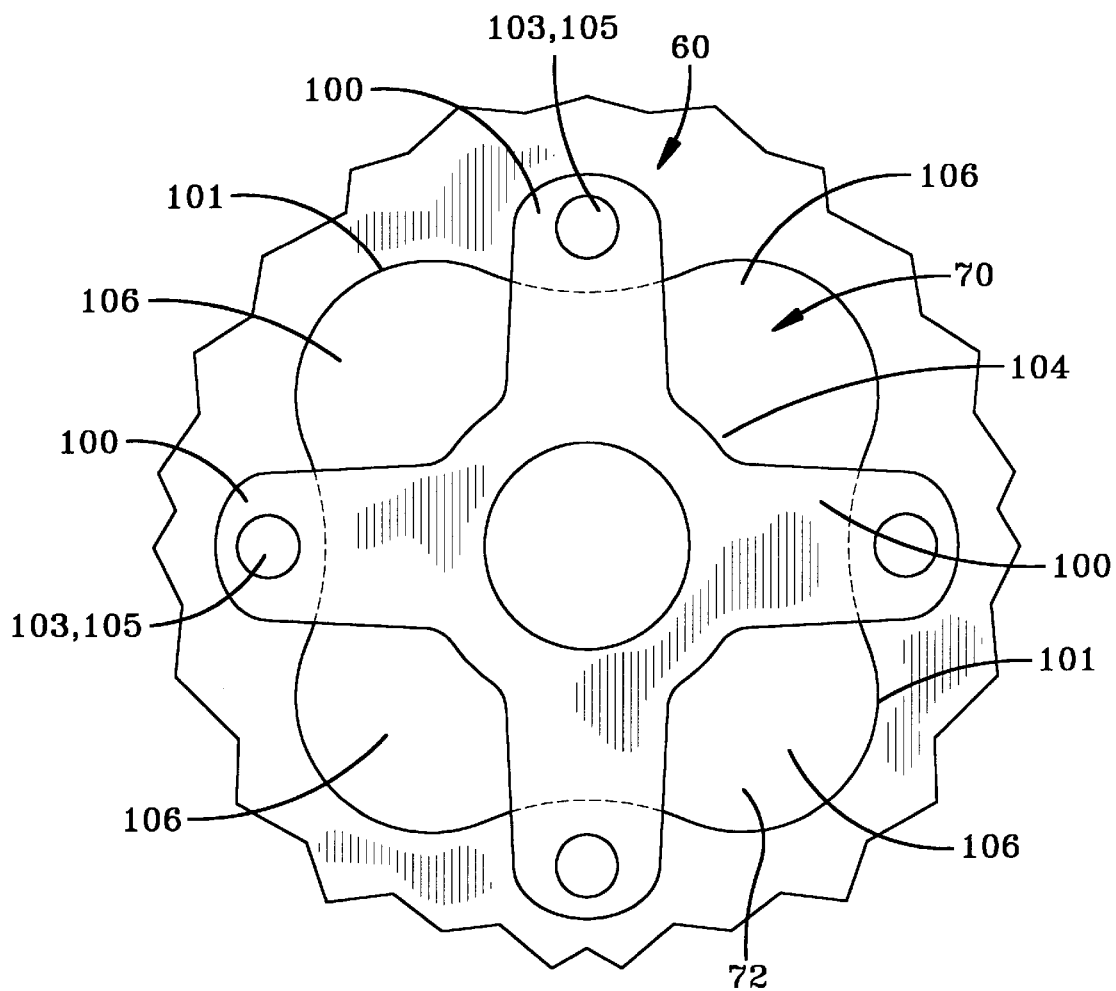
FIG. 5 is an enlargement of the area surrounding the spindle of the mower deck of FIG. 3.

As shown in FIG. 2 the direction and location of the pressurized air in respect to the trailing edge of the discharge chute can vary. The most efficient location is tangential 56 to the path of the mower blade directed straight at the trailing edge or slightly upstream thereof. This creates a relatively high pressure air stream at this location, thus encouraging the grass clippings to pass out of the discharge chute. As represented in FIG. 2, the actual location and direction of the air stream may vary. Keeping the air stream direction the same, movement radially of the center of the mower deck has a minimal additional effect on the air flow. However, angling the air flow at an angle greater than tangential (i.e. over 90 deg. in respect to a radial line to the point of departure) causes a certain amount of parasitical power loss via conflicting air streams (and thus is not preferred). An angle of plus or minus 20° is disclosed, as is a radial displacement 57 of plus 3 minus 1.5 inches (in a 30" deck), both taken in respect to the tangent 56 (see FIG. 2). In general the greater the radial displacement, the lesser the angle should be and the higher the auxiliary air pressure must be (and vice-versa).

The pressurized air can be provided by any motor driven fan, either integral with the mower deck or separate therefrom. For example, a small separate blower mounted above the mower deck and driven by a belt would be appropriate in units where the size and complexity of an integral fan causes designs compromises such as multi-spindle side by side mower decks.

The particular pressure differential device disclosed is a radial fan 15 formed integrally with the spindle 60 of the rotary blade 52 in a confined space 58 on the underside of the top 55 of the mower deck. It is preferred that the space 58 be treated through the addition of a supplemental piece 61 which is separately bolted to the bottom of the mower deck 50 so as to not disturb the integrity of the top 55 of the mower deck, most particularly at the critical location of the mounting of the spindle 60.

In that the particular pressure differential device disclosed is radial fan 15, the supplemental piece 61 is mounted off center in respect to the axis of rotation of the radial fan so as to provide a increasing cross section generally spiraling air passage or duct 65 surrounding the radial fan. The smallest cross-section 62 of this air passage 65 is located at or slightly downward of the critical trailing edge 54 of the discharge chute with the longitudinal axis of the air passage or duct running through the trailing edge of the discharge chute. The fan opening 66 is located near to the discharge chute directed tangentially substantially towards or slightly upstream of the trailing edge 54 of the discharge chute 51. In this respect it is noted that the minimum diameter cross sectional area 62 encourages the flow of air through the fan opening 66 by creating an air restriction downstream of the fan opening. Further, the generally spiraling air passage 65 produces a smooth laminar flow of air out of the fan opening 66, thus maximizing the efficiency of the air flow at this particular location.

In the particular embodiment disclosed, since the fan is a radial fan 15, it obtains its source of air through a hole 70 provided in the top 55 of the mower deck nearest the central axis of rotation of the radial fan. This hole 70 allows for the radial fan to pill air therefrom and thence outward, thus pressurizing the air in the increasing cross section spiraling air passage 65.

The hole 70 in the present invention is of a unique configuration so as to maximize deck strength while reducing manufacturing complexity. In specific, in the normal mowing deck the spindle is mounted in a central circular hole having an inner diameter only slightly more than the outer diameter of the spindle.

While it is technically possible for one to merely enlarge the central hole or add additional surrounding holes to provide a source of air for the fan 15, these both reduce the strength of the deck as well as, especially for the former, increasing the size, cost and complexity of the spindle (which now has to be self supporting over a longer distance than otherwise). In contrast in the present invention the hole 70 is of cloverleaf 72 configuration complementing the four support arms 100 of the spindle 60. The center portion 104 of the cloverleaf configured hole is covered by the spindle. Thus, like the circular hole in conventional mower decks, very little air can pass through this center portion of the hole. However, each of the four corner portions 106 of the clover leaf configured hole are not covered by the spindle and thus air can pass through them. The edge of the mower deck 101 surrounding the center portion 104 of the hole has deck holes 103 in it for receiving a mounting means for mounting the spindle 60 to the mower deck.

The spindle 60 has support arms 100. Each support arm 100 has a support arm hole 105 in it for receiving a mounting means to mount the spindle to the mower deck. The deck holes 103 and the support arm holes 105 are alignable for receiving a mounting means to mount the spindle to the mower deck. One way that that the deck holes 103 and support arm holes 105 can be fashioned is by the use of a conventional drill. The mounting means can be a screw, bolt, nail, rivet or any other mounting means. The edges of the cloverleaf 72 are folded (down preferably) so as to create reinforcing flanges 102—thus, stiffening the deck at this critical location (the hole shape would vary dependent on the spindle). This configuration allows the drive spindle 60 to remain the same size as in a conventional deck without compromising the strength of the unit while still providing the needed air passage. By having the spindle in such a location, the air passing over it also cools the critical bearings and keeps the belt area cleaner than otherwise.

Although the invention has been described as preferred embodiment in a certain degree of particularity, it is understood that numerous changes can be made without deviating from the invention as hereinafter claimed.

We claim:

1. In a rotary mower deck having a spindle mounted in a hole, the improvement of said hole having a clover leaf configuration, said cloverleaf configured hole comprising a center portion and four corner portions, the portion of the mower deck comprising the edge of said center portion of said clover leaf configured hole further comprising deck holes, the spindle having support arms and characterized in that each of said support arms comprises a support arm hole, characterized by the addition of reinforcing flanges extending off the edge of said cloverleaf configured hole.

* * * * *